No. 697,189. Patented Apr. 8, 1902.
W. B. ALDEN.
MACHINE FOR MAKING BUTTONS OR OTHER ARTICLES.
(Application filed June 27, 1901.)
(No Model.) 5 Sheets—Sheet 2.

Witnesses:
Joseph T. Brennan
E. D. Chadwick

Inventor:
William B. Alden,
by Oliver R. Mitchell,
Attorney.

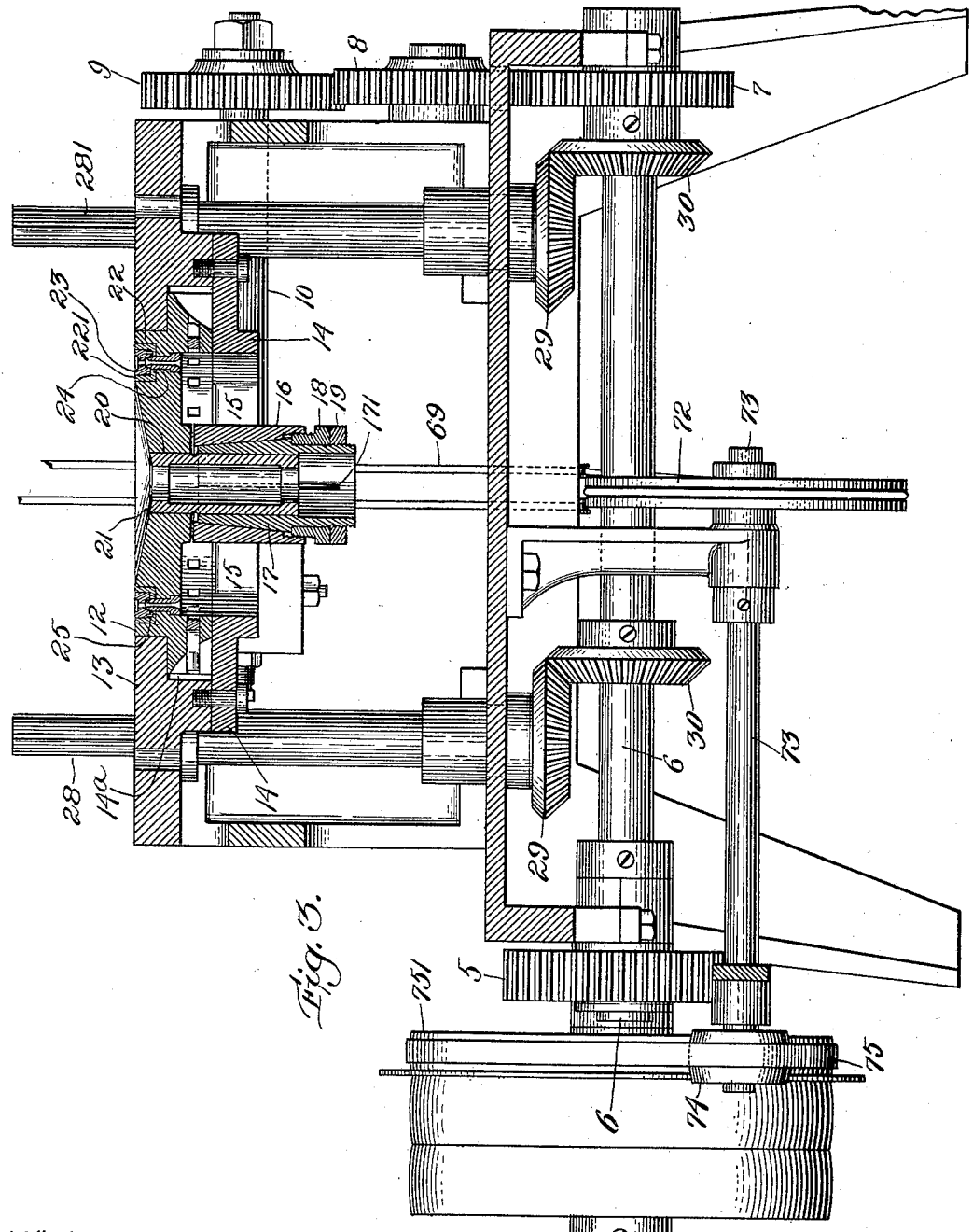

No. 697,189. Patented Apr. 8, 1902.
W. B. ALDEN.
MACHINE FOR MAKING BUTTONS OR OTHER ARTICLES.
(Application filed June 27, 1901.)
(No Model.) 5 Sheets—Sheet 4.
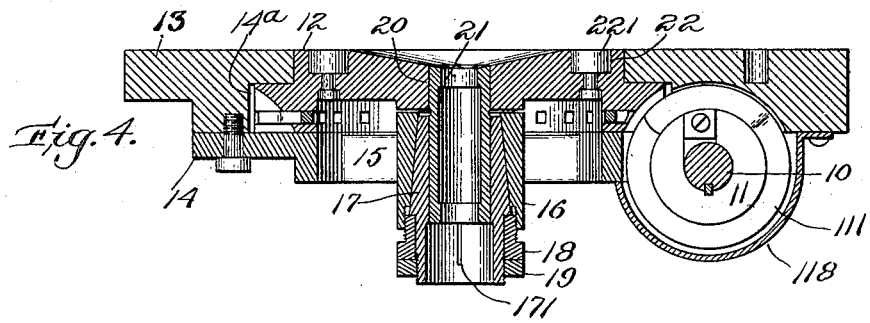
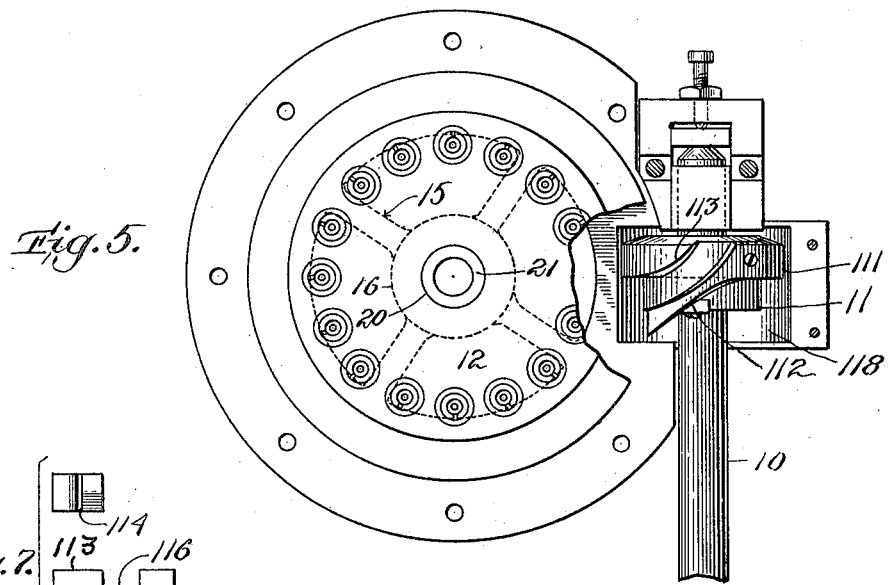
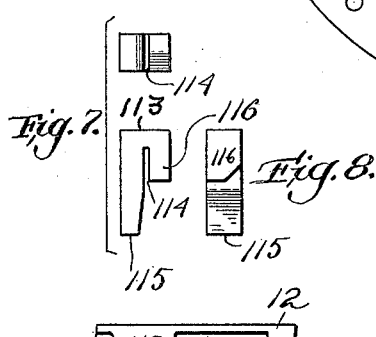
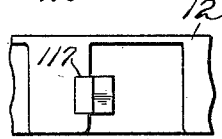
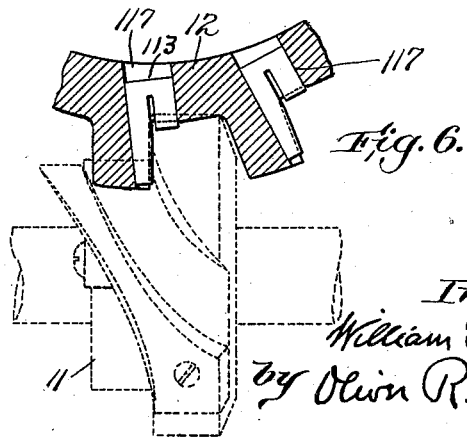

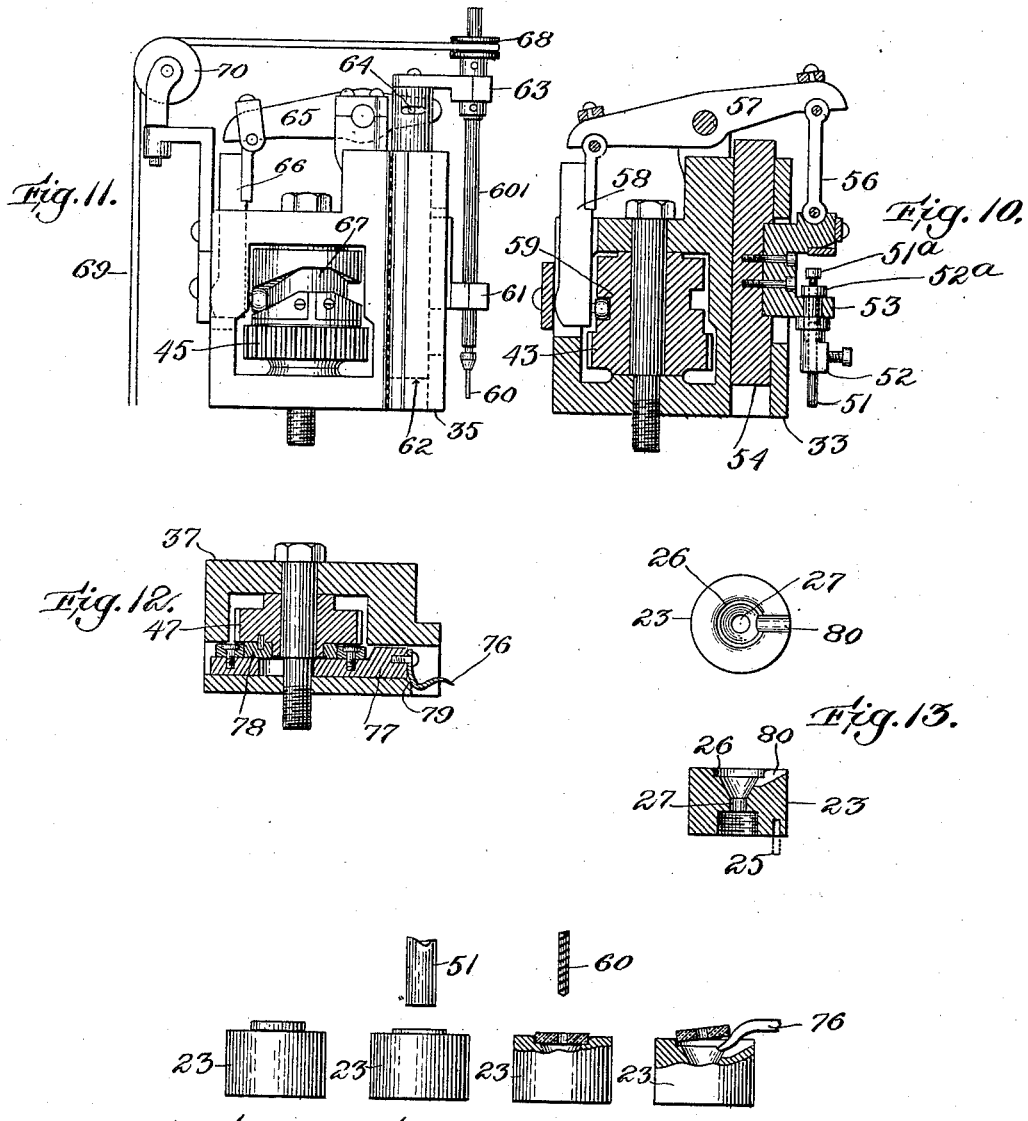

UNITED STATES PATENT OFFICE.

WILLIAM B. ALDEN, OF SPRINGFIELD, MASSACHUSETTS.

MACHINE FOR MAKING BUTTONS OR OTHER ARTICLES.

SPECIFICATION forming part of Letters Patent No. 697,189, dated April 8, 1902.

Application filed June 27, 1901. Serial No. 66,223. (No model.)

*To all whom it may concern:*

Be it known that I, WILLIAM B. ALDEN, of Springfield, in the county of Hampden and State of Massachusetts, have invented an Improved Machine for Making Buttons or other Articles, of which the following is a specification, reference being had to the accompanying drawings, in which—

Figure 1:
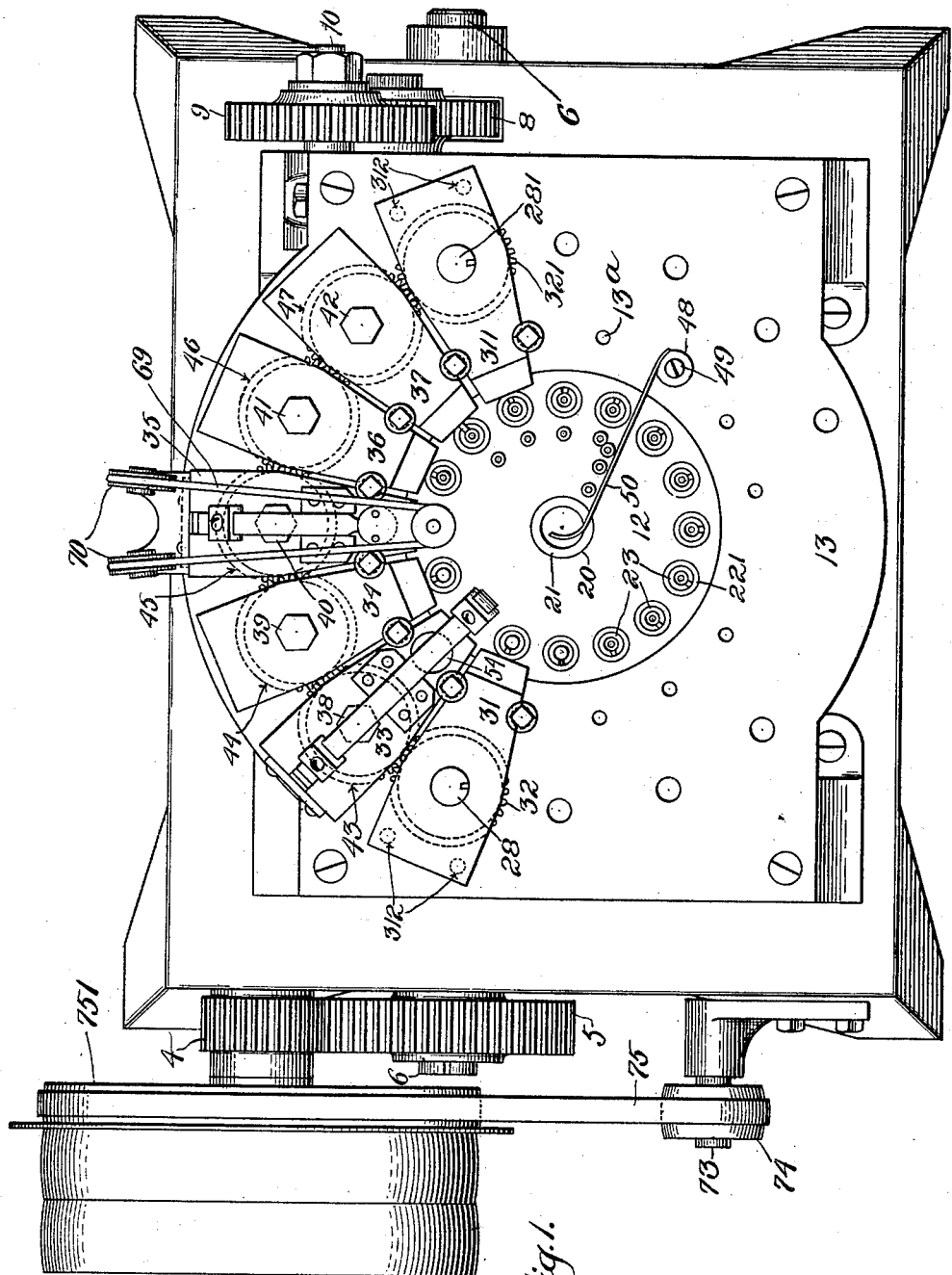
Figure 2:
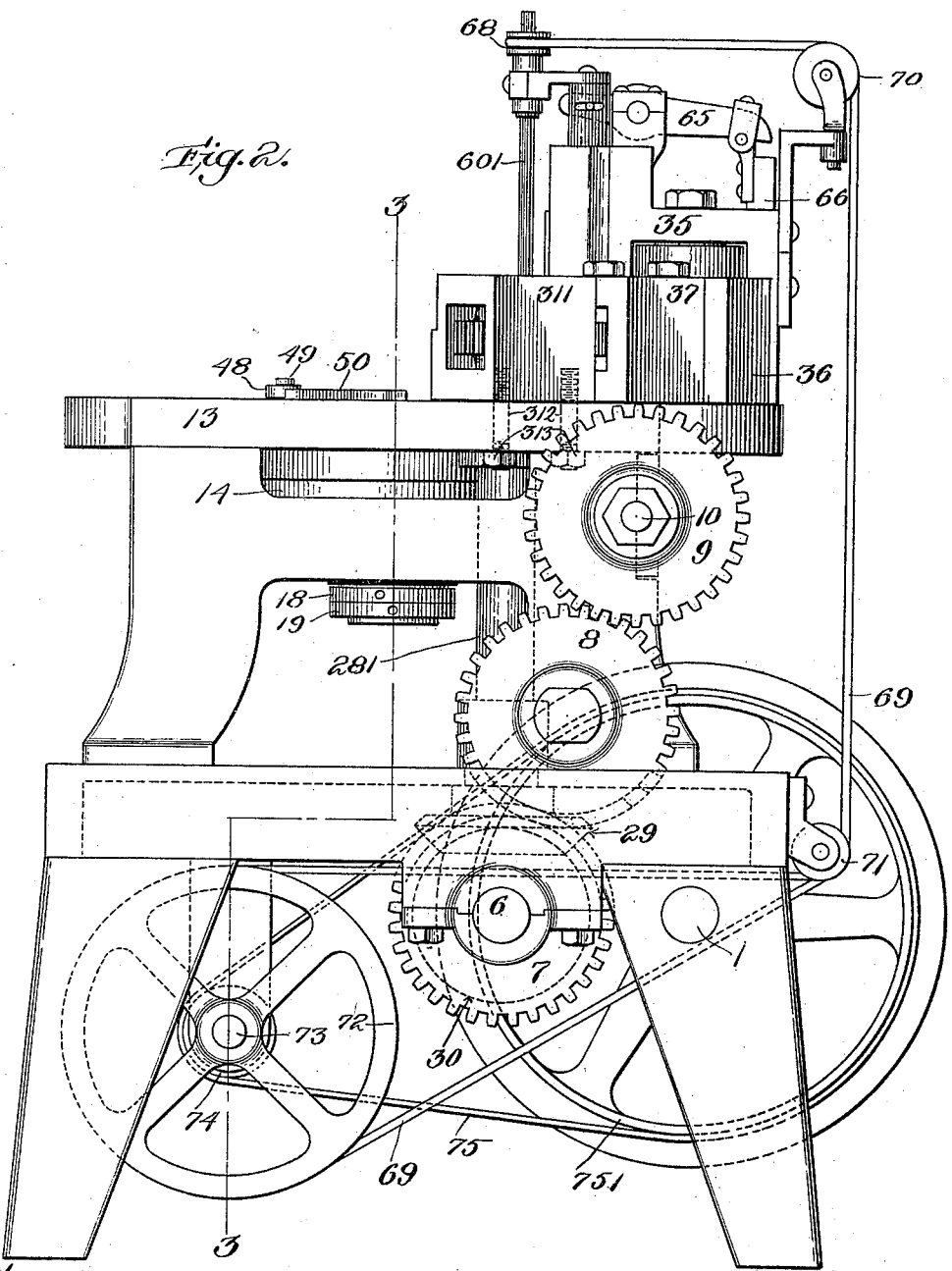

Figure 1 is a plan view of a machine embodying my invention. Fig. 2 is an end elevation of the machine shown in Fig. 1. Fig. 3 is a section on line 3 3 of Fig. 2. Figs. 4 and 5 are details of the dial and dial-actuating means hereinafter described. Figs. 6, 7, 8, and 9 are details hereinafter described. Figs. 10, 11, and 12 are details of the tool-holding attachments hereinafter described. Fig. 13 shows a plan and central vertical section of the chuck hereinafter described. Figs. 14 to 17, inclusive, are details illustrating the operation of the machine.

My invention relates to that class of machines in which a number of tools perform successive operations upon a single article which is moved automatically from one tool to another, and the successive operations are all performed simultaneously by the different tools; and it relates especially to machines of this class in which the tools are arranged around a rotatable table or dial upon which are placed the articles to be operated upon.

The chief advantage of a gang-machine is the gain in speed in performing the various operations desired. It is essential to the successful working of such a machine that each article should be held in exactly the same position under each tool while the tool is performing its operation.

The main object of my invention is to provide a machine which will operate rapidly and with great accuracy. To this end I employ many new features, among them a combined rotating and locking device of novel construction for turning the dial quickly and locking it the instant it reaches the desired position. To insure accurate and easy adjustment, I employ also a new form of tooth, the position of which may be varied readily without taking the dial out of the machine.

Referring to the drawings, 1 represents the main shaft of the machine, to which power is applied. This shaft is journaled in bearings on the frame of the machine, and upon it are mounted a loose and a tight pulley to be driven from a source of power. On shaft 1 is fast a pinion 4, which meshes with a gear 5, which is fast on shaft 6, journaled in bearings on the frame of the machine. To shaft 6 is also fast a gear 7, which drives a gear 9 through an intermediate gear 8, journaled on a stud projecting from the frame of the machine. Gear 9 is fast on a shaft 10, mounted in bearings on the frame of the machine, and shaft 10 has fast to it the cam 11, which is at the same time a driving-cam and a locking device. This cam engages teeth on the dial or work-support 12 and serves both to rotate the dial between operations and to hold it accurately in position while the tools are operating. To perform this double function, the cam is formed with a straight portion 111 and two oblique portions 112 and 113. When a tooth on the dial 12 is engaged by part 112, the dial is moved forward and another tooth drawn into the space in front of surface 113. When the first tooth leaves part 112, the forward motion continues until the second tooth reaches part 111. The teeth on dial 12 are held firmly against the parts 111, 112, and 113 by the friction device at the hub of the dial, which device is fully described below. The dial is thus held accurately in one position so long as part 111 engages the tooth. This straight or locking portion 111 extends around a large part of the circumference of the cam. As shown in the drawings, the time occupied in moving the dial is reduced to a small fraction of the time required for the operation of the tools, and a great saving results. The locking takes place immediately when the tooth of dial 12 reaches part 111 on the cam. The operations can thus begin the instant the dial comes to rest without any waste of time in locking it in position. This saving of time accomplished by my novel form of cam and locking device is of the utmost importance in machines of this character.

In order to produce buttons or other articles which shall be exactly alike, it is necessary that the devices for holding the various articles to be operated upon in position upon the dial and the teeth which engage the cam should be exactly equidistant, so that whichever tooth is holding the dial in position the articles to be operated upon will all be brought into exactly the same position under the various tools. To make possible this accurate adjustment of the teeth and to take up wear, I employ a tooth, which is shown in detail in Figs. 6, 7, 8, and 9 and is numbered 113. This tooth is split, as at 114, so as to have two legs 115 and 116. They are preferably made of spring-steel, and when forced into the pockets 117, around the circumference of dial 12, the spring of the material holds them firmly in position. The leg 115 is made longer than 116 and constitutes the face of the tooth, which is engaged by the dwell portion of the cam 11. The other leg is made shorter, so as to be clear of the cam. The pockets 117 are made slightly tangential with relation to the dial, so that the tooth-surface 115 may be moved forward and backward with relation to the direction of the movement of the dial by driving the tooth in or drawing it out from the pocket. In this way a very accurate adjustment of the teeth may be made or a single tooth may be adjusted to take up wear with a few light taps of a hammer. Cam 11 is inclosed by a casing 118, which may contain oil in which said cam runs for the purpose of keeping the surfaces of the teeth and of the cam lubricated.

The dial 12 is mounted in a table 13, which forms part of the frame of the machine. As shown in the drawings, the upper surface of the dial is flush with the top of the table. Fastened to the under side of table 13 is a supporting-ring 14, upon which the dial rests and turns. Around the outer edge of the dial is an annular space 14$^a$, which may be kept full of oil to lubricate the bearing between the dial and the supporting-ring and also to lubricate the teeth 113, above described. This ring 14 is connected by spokes 15 with a hub 16, which is made with a tapering hole through it to receive the correspondingly-tapered bushing 17. This bushing is split, as shown at 171. Hub 16 is threaded interiorly at its lower end to receive a nut 18, by means of which bushing 17 is held within the hub 16, while the lower extremity of bushing 17 is exteriorly threaded to receive on it the check-nut 19, which binds nut 18 against a shoulder on bushing 17.

Dial 12 is made with a central opening 20, in which is fastened a downwardly-projecting stud 21, which extends into bushing 17. By adjusting the nut 18 bushing 17 may be forced into hub 16 and caused to bind with greater or less force upon stud 21, as is desired. The friction thus produced between stud 21 and bushing 17 prevents dial 12 from moving too freely and holds the teeth on the rim of dial 12 firmly against the dwell portion of the cam 11 while the tools hereinafter described are performing their respective operations.

Dial 12 is provided with a number of pockets 22, which are each lined with bushings 221, adapted to receive a die, chuck, jig, or other means for holding the articles to be operated upon. In the drawings each bushing is shown holding a chuck 23, held in place by a hollow screw 24 and a pin 25, which locks the chuck in position. In the top of each chuck is the recess 26, and from each recess an opening 27 extends downward through the chuck and the hollow screws 24, making a passage-way through which material may drop. The rotation of cam 11 moves forward each chuck and holds it securely in position under each tool successively. Any form of tool may be employed operating vertically, horizontally, or obliquely. In the drawings I have shown three forms only, which respectively press the blank firmly into the chuck, drill a hole through it, and expel it from the chuck.

The tools are driven by the two shafts 28 and 281, upon which are fast bevel-gears 29, meshing with bevel-gears 30 on shaft 6. These two shafts 28 and 281 extend at their upper ends above the table 13 and through the frames 31 and 311, which are detachably fastened to table 13 by studs 312 and nuts 313, and within the frames 31 and 311, respectively, are gears 32 and 321, which are splined to shafts 28 and 281, respectively. Between frames 31 and 311 are arranged other frames 33, 34, 35, 36, and 37, which are detachably fastened in place on table 13 by means of studs 38, 39, 40, 41, and 42. When extra heavy work is to be done, the tap-holes 13$^a$ are utilized, a bolt having a washer at its upper end being screwed into the tap-holes, the edges of which washer engage the adjacent frames and as the screw is tightened bind the inner end of the frames securely upon the bed-plate 13. On stud 38 is journaled a gear 43, which meshes with gear 44, journaled on stud 39, and the latter gear meshes with gear 45, journaled on stud 40, which gear in turn meshes with gear 46 on stud 41 and that in turn with gear 47 on stud 42. Gear 47 meshes with gear 321. The power for driving the various tools is therefore applied at both ends of this chain of gears—that is, at gear 321 and at gear 32.

As shown in the drawings, frames 33, 35, and 37 carry tools which operate upon the blanks placed upon the dial, while frames 34 and 36 simply support idle gears. It is obvious that, if desired, each of these frames and also frames 31 and 311 might carry tools, thus more than doubling the number of tools which could be arranged around the dial. The construction shown, however, has the advantage that each article is brought to rest within the view of the operator after each operation, and he may at once see whether the operation has been properly performed.

It is of course immaterial what the character of the different tools is or in what relation they are arranged. The mode of operation of the machine is sufficiently illustrated by the tools which I have shown, which press the button firmly into the chuck, drill a hole in it, and throw it out of the chuck toward the center of the dial. These tools are typical, the first having a vertical reciprocating motion, the second having this motion and a rotary motion besides, and the third having a horizontal reciprocating motion. Obviously tools with an oblique reciprocating motion might be used, as well as those shown. The surface of the dial is preferably made so as to slope from the pockets 22 toward the central opening 20, so that when finished articles are removed from the chucks by the tool on frame 37 they tend to travel toward the center of the dial of the machine. To assure their reaching the center, I provide the arm 50, which is fastened at one end to a block 48, which is held in place upon table 13 by screw 49. The other end of arm 50 is just over the edge of the central opening 20, as shown in Fig. 1, so that the position is slightly tangential with respect to the dial, and as the dial carries along the finished buttons the arm sweeps them toward the center and into the opening 20, through which they are discharged.

Fig. 10 is a detail of the tool and tool-operating device mounted in frame 33. 51 represents the tool—a plunger adapted to force the blanks firmly into the chucks. This plunger is held in the tool-holder 52, which is attached to a block 53, and block 53 is fastened to a slide-bar 54, mounted in ways in frame 33, so as to move freely up and down.

The peculiar organization of parts as shown in Fig. 10 is especially effective in punching operations, the power being applied directly above the tool and the tool being mounted upon a slide carried in a way formed in the very body of the frame, (see Figs. 10 and 1,) so as to preserve perfect alinement.

The tool-carrier 52 is secured to the sliding member by a hollow screw $52^a$, which enters a longitudinal tapped bore in the tool-holder. A gage-screw $51^a$ screws through the hollow screw $52^a$ and passes into the bore of the tool-holder, where it serves to regulate the longitudinal position of the tool 51, which when adjusted longitudinally is finally clamped in position by a set-screw. By this construction great accuracy of longitudinal adjustment of the tool may be obtained, which is particularly desirable when the tool is used to press an article into place in order to accomplish the desired result without scarring or defacing the article, and, furthermore, the tool-holder can be unscrewed and removed with a minimum of trouble and time.

To the upper end of block 53 is pivotally attached a link 56, which at its upper end is pivotally connected with lever 57, fulcrumed on frame 33, and pivotally connected at its other end with a slide 58. This slide is mounted on ways in frame 33, so as to move freely up and down, and carries at its lower end a cam-roll which is engaged by a cam 59, integral with gear 43 of the train of tool-operating gears. At each revolution of this cam plunger 51 is raised and lowered.

Fig. 11 shows in detail the drill 60, carried by frame 35, and the means for operating it. This drill is mounted upon the lower end of a spindle 601, which is journaled near its lower end in a block 61, fast to a slide 62, mounted in frame 35, and near its upper end in a block 63, also fast to slide 62. Slide 62 is slotted horizontally to engage a pin 64, projecting from a lever 65, fulcrumed on frame 35, and lever 65 is pivotally connected at its other end to a slide 66, mounted in ways in frame 35. Slide 66 carries at its lower end a cam-roll, which engages a cam 67, which is integral with the constantly-driven gear 45 of the train of tool-actuating gears. Each time gear 45 and cam 67 make one revolution drill 60 is lowered and raised. The drill is driven by the belt 69, which engages the pulley 68 at the upper end of shaft 601. This belt 69 passes over sheaves 70, mounted on frame 35, and over sheaves 71, mounted on the frame of the machine, to and around a pulley 72, mounted on the shaft 73. The shaft 73 is journaled in brackets attached to the frame of the machine and has upon it a pulley 74, which is connected by a belt 75 with a pulley 751 on the main shaft on the machine.

Fig. 12 shows a detail of frame 37 and the tool and actuating device carried thereby. This tool is a spring-finger 76 for expelling the button from the chuck. This finger is fast to the end of slide 77, mounted on horizontal ways on frame 37. This slide carries cam-rolls which are engaged by an eccentric cam 78, which is integral with gear 47, above described. Each revolution of cam 78 moves slide 77 and finger 76 forward and back. When in its retracted position, as shown at Fig. 12, the heel of the spring-finger 76 bears against shoulder 79 of frame 37, which raises the free end of finger 76 and holds it in an elevated position above dial 12. Cam 78 is so adjusted that the tool is in this position all the time that the dial is in motion. The edge of chuck 23 on dial 12 is formed with a radial groove 80 on its upper surface, which groove is also radial to the center of the dial 12. This groove extends from the central opening 27 to a point outside the blank held by the chuck, and the bottom of the groove is below the level of the blank. As finger 76 is moved forward it is released from the pressure of shoulder 79, and its free end springs downward and enters this groove 80, passing under the blank in the chuck. The finger is so shaped at its forward end that it is bent down by the under side of the blank until the tension upon the spring-finger overcomes the friction which holds the blank in the chuck. The spring-finger then spring, up to its normal position, dislodging the blank and throwing it toward the central opening to the dial 12. Cams 59, 67, and 78 are preferably so adjusted that the operations of the three tools governed by them are performed each time that the dial comes to rest, but not at exactly the same moment. This avoids throwing the strain of three operations upon the driving power at once and makes it possible to operate the machine with far less power than if the operations were exactly simultaneous.

It is obvious that the tool-holding frames may be placed at intervals all around the entire circumference of the dial instead of only part way around, as shown in the drawings. Thus seven or eight operations may be performed upon an article without taking it from the machine, or articles may be fed from both sides of the dial and two sets of tools may be employed.

The operation of the machine has been described with reference to making buttons; but it is obvious that it may be employed equally well in producing a large number of different articles which require to be punched, drilled, drawn, or polished. It can be used to especial advantage upon articles which require two or more operations to complete them.

It will be obvious from the foregoing description that each tool-operating device is complete in itself, interchangeable with any other tool-operating device, and as the operating-gears of each tool-operating device are of uniform size and arranged upon a uniform plane it is clear that any operation which requires a reciprocating or a reciprocating-rotating tool, whether the direction of action of these tools be perpendicular, horizontal, or upon some line between perpendicular and horizontal, may be performed in any sequence desired, as a tool having the necessary movement may be placed around the dial at any point desired, and, if desired, idler-tools whose function is merely to transmit power may be placed between the working tools. This feature is, so far as I am aware, novel with me and is of the highest importance, inasmuch as it gives a practically indefinite range of adaptability to my machine, and inasmuch as the interchangeability of the various tool-operating devices is very simple the machine may be arranged for any operation or series of operations in any desired sequence with a minimum amount of trouble.

I claim—

1. In a machine of the character described, in combination a rotary work-support adapted to hold a number of blanks to be operated upon; a group of stationarily-supported tools disposed about the periphery of the work-support; a cam coöperating with teeth fast to the work-support and adapted to move the work-support a step during part of the revolution of the cam and to lock the work-support during the balance of the revolution of the cam; means for driving the tools and cam, and means connecting said tools and cam for throwing the tools into and out of action while the work-support is locked by the cam.

2. In a machine of the character described, in combination, a rotary work-support adapted to hold a number of blanks to be operated upon; a group of stationarily-supported tools disposed about the periphery of the work-support; a cam coöperating with teeth fast to the work-support and adapted to move the work-support a step during part of the revolution of the cam, and to lock the work-support during the balance of the revolution of the cam; means for driving the cam; a train of intermeshing gears; means for driving the train of gears; and means operatively connecting each tool with one of the gears.

3. In a machine of the character described, in combination, a rotary work-support adapted to hold a number of blanks to be operated upon; a group of stationarily-supported tools disposed about the periphery of the work-support; a cam adapted to move the work-support a step during part of its revolution and to lock the work-support during the balance of the revolution of the cam; means for driving the cam; and teeth fastened to the work-support with provision for adjustment so that each tooth may be adjusted independently of the others to position the work-support relatively to the tools for each step movement of said support.

4. In a machine of the character described, a rotary work-support having tangential pockets in the periphery thereof, and adjustable teeth fitting into said pockets, adapted to be engaged by the cam-actuating means.

5. In a machine of the character described, a rotary work-support; means for imparting an intermittent motion to the work-support; and a brake for holding the work-support stationary between movements, in opposition to which brake the work-support is moved intermittently by its actuating means.

6. In a machine of the character described, in combination, a work-support; means for imparting an intermittent movement to the work-support; a multiplicity of tools; and means, including a train of gears, for throwing the tools into and out of action while the work-support is at rest; means for applying power to the train of gears; and means connecting each tool with one of the gears.

7. In a machine of the character described, in combination, an oil-chamber surrounding the periphery of the work-support; the work-support; a cam for actuating the work-support, and an oil-chamber surrounding said cam.

8. In a machine of the character described, in combination, a rotary work-support; means for imparting an intermittent movement to the work-support; a group of stationarily-supported tools disposed about the periphery of the work-support and means for throwing the tools of the group into action successively during each dwell of the work-support.

9. In a machine of the character described, the tool-operating device consisting of a tool-carrier sliding in perpendicular ways in a frame; a cam; a slide actuated by the cam; and means connecting the slide and tool-carrier, whereby the tool-carrier is perpendicularly reciprocated by the revolution of the cam.

10. In a machine of the character described, the tool-operating device consisting of the tool-carrier sliding in perpendicular ways in the frame; a cam; a slide actuated by said cam; means connecting the slide and tool-carrier to cause the tool-carrier to be perpendicularly reciprocated by the revolution of the cam; and means to rotate the tool as it is reciprocated.

11. In a machine of the character described, a spring-finger 76; slide 77 on which said finger is mounted; cam 78 for operating said slide, chuck 23 having a groove 80, and means to actuate the cam; all combined and operating substantially as described.

12. In a machine of the character described, the tool-operating device, consisting of the tool-carrier sliding in horizontal ways in a frame; a cam-pin fast to the carrier; a cam to actuate the pin and carrier and fast to a spur-gear; and the spur-gear.

13. In a machine of the character described, a friction device consisting of an interiorly-tapered hub 16; an exteriorly-tapered split bushing 17 fitting within that hub; a stud 21 fast to the rotary work-support and within the bushing 17; means to force and retain the bushing within the hub; all organized and operating to cause the split bushing to grip the stud with a constant grip as desired.

14. In a machine of the character described, a bed-plate; a rotary work-support sliding near its periphery upon that bed-plate; teeth fast to the rotary work-support; a cam supported by the bed-plate and engaging the teeth to actuate the rotary work-support; and tool-operating devices fast to the bed-plate.

15. In a machine of the character described, the tool-operating device, consisting of a frame; a cam within that frame; a rocker-arm pivoted upon that frame; a sliding member, sliding in ways in the frame engaging the cam and connected with the rocker-arm; a second sliding member, sliding in ways in the frame and having a tool-carrying projection extending beyond the frame; a link connecting this projection and the rocker-arm; all organized so that the motion of the rocker-arm is translated into reciprocation of the sliding member, and so that the power is applied directly above the projection and the tool.

16. In a machine of the character described, a rotary work-support; means for imparting an intermittent movement to the work-support; and a multiplicity of interchangeable self-contained tool-operating mechanisms, each transmitting power to its neighbor, arranged about the rotary work-support.

17. In a machine of the character described, in combination, a rotary work-support; a pocket in the upper face of said support; a hollow work-holder in the pocket; an opening through the bottom of said pocket; and a hollow screw in said opening for holding the work-holder in the pocket.

18. In a machine of the character described, the combination with a work-support-carrying chuck 23 having a groove 80, of the finger 76 for discharging the work from chuck 23; and means for operating finger 76 to cause it to enter groove 80 under the work and to discharge the latter from the chuck.

19. In a machine of the character described; a rotary work-support; means for imparting an intermittent movement to the work-support; a train of tool-operating gears; a number of interchangeable frames by which said gears are carried; tools on some of those frames; and means operatively connecting those tools with their respective gears.

20. In a machine of the character described, a rotary work-support; means for imparting an intermittent movement to the work-support; and a multiplicity of interchangeable self-contained tool holding and operating mechanisms arranged about the rotary work-support.

WILLIAM B. ALDEN.

Witnesses:
J. FRANK LOW,
ARTHUR L. FISK.